United States Patent Office 3,287,234
Patented Nov. 22, 1966

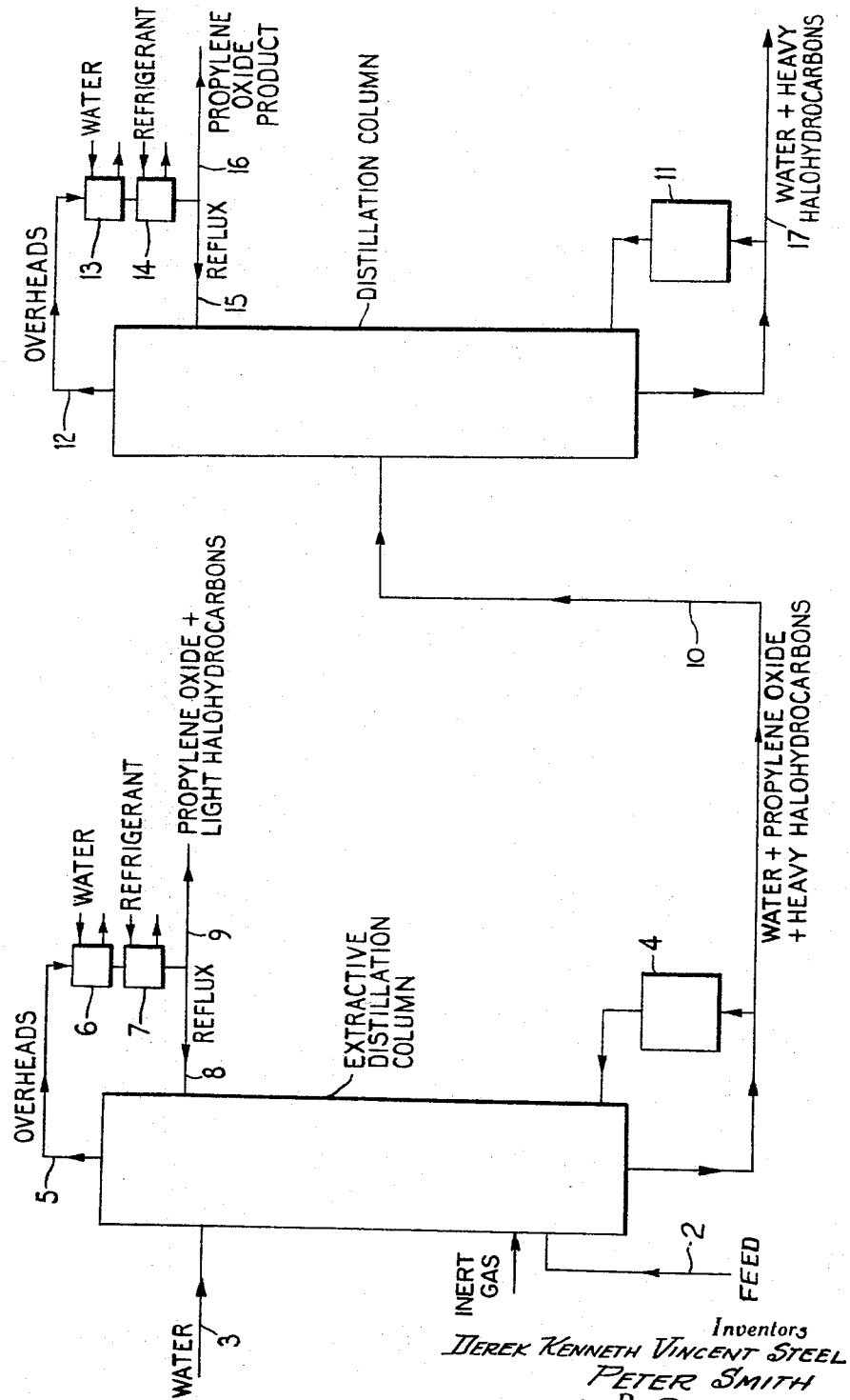

3,287,234
EXTRACTIVE DISTILLATION OF PROPYLENE OXIDE CONTAINING HALOHYDROCARBON IMPURITIES
Derek Kenneth Vincent Steel and Peter Smith, both of Norton-on-Tees, England, assignors to Imperial Chemical Industries Limited, Millbank, London, England, a corporation of Great Britain
Filed July 12, 1965, Ser. No. 470,985
Claims priority, application Great Britain, Aug. 15, 1960, 28,190/60
6 Claims. (Cl. 203—49)

This invention relates to the purification of 1,2-propylene oxide. This is a continuation-in-part of our prior co-pending U.S. application, Serial No. 126,858, filed July 26, 1961, and now abandoned.

1,2-propylene oxide is commonly known to contain as impurities small quantities of halohydrocarbons particularly if it has been prepared by dehydrohalogenation of halohydrin. For example in U.S. Patents Nos. 2,868,806 and 2,868,807 it is stated that alkylene oxides prepared by the dehydrohalogenation of the corresponding chlorhydrin contains a chlorinated product as an impurity. The impurity is thought to be vinylidene chloride or a similar compound. These small quantities of halohydrocarbons are sufficient to make the propylene oxide unsuitable for certain purposes such as the preparation of high molecular weight polyglycols. However these impurities are not in every case readily removed by ordinary distillation methods. Thus 1,2-propylene oxide as prepared by dehydrochlorination of propylene chlorhydrin is often contaminated with a number of chlorine compounds, of which some may be removed by distillation, for example, propylene dichloride leaving however others the removal of which is impractical by ordinary distillation methods. For example isopropyl chloride B.P. 36° C., vinylidine chloride B.P. 32° C., 2-chloropropene B.P. 23° C., and n-propyl chloride B.P. 47° C. are difficult to separate by distillation from the 1,2-propylene oxide which boils at 35° C. at atmospheric pressure.

The present invention proposes a process for the removal of light halohydrocarbons from 1,2-propylene oxide which comprises a selective absorption step in which the propylene oxide and light halohydrocarbons are respectively separated into liquid and vapour phase by contact with water and a subsequent distillation step in which the propylene oxide is recovered as a distillate of the liquid phase from the first step.

In this specification any halohydrocarbons which due to involatility tend to be left in the liquid phase are referred to as heavy halohydrocarbons and those which tend to pass into the vapour phase are referred to as light halohydrocarbons. Halohydrocarbons which tend to be left in the liquid phase and which for the purposes of this specification are heavy halohydrocarbons, are those boiling above about 50° C. at atmospheric pressure, while those halohydrocarbons which tend to pass into the vapour phase and which are described as light halohydrocarbons boil below about 50° C. at atmospheric pressure.

The first step of the process according to this invention comprises essentially progressive contact of propylene oxide with liquid water through a column. This may be effected in any convenient fashion. For example water may be fed to the column simultaneously with the propylene oxide, but preferably at a higher feed point, the conditions in the column being such that the light halohydrocarbons escape as vapour from the column, leaving the propylene oxide and possibly some heavy halohydrocarbons with the water in the liquid phase which is then distilled in the second step. The relative quantity of water which is used is not critical, and one or two liquid phases may be present in the column. However good purification of propylene oxide has been obtained by contacting the mixture with its own volume of water in the first step.

The column in which the first step of the process is effected is preferably provided with a reflux and may be furnished with a reboiler by which sufficient heat is supplied to drive the light halohydrocarbons as vapour through the column. As the light halohydrocarbons are present in low concentrations (for example up to 0.5% by weight chlorine) the reflux consists of propylene oxide boiling at a temperature of 35° C. at atmospheric pressure together with the light halohydrocarbon impurities. The latter are then removed continuously together with some propylene oxide. It is generally convenient to carry out the process at atmospheric pressure or a small positive pressure, e.g. 1½ atmospheres, as the only effect of increasing or decreasing the pressure is to respectively raise or lower the boiling points of the materials fed to the columns. Operation of the two steps at a reduced pressure, and hence reduced temperature, may however be utilised to minimise glycol formation due to hydrolysis of propylene oxide, refrigeration then being used to condense the overheads. Alternatively, the temperature may be reduced and glycol formation minimised by admitting a nitrogen stream to the base of the first column to facilitate the removal of volatile halohydrocarbons in the first step without heating the column.

The process of the present invention may be performed as a continuous process in which the aqueous propylene oxide mixture is continuously withdrawn from the first step and fed to the second step. The two steps may also be performed independently.

Crude propylene oxide to be processed according to the present invention may be previously distilled to remove heavy halohydrocarbons e.g. propylene dichloride. This preliminary action is not, however, usually necessary, since those heavy halohydrocarbons which remain with the propylene oxide in the liquid phase from the first step of the process are removed as heavy ends in the second distillation step.

Propylene oxide containing 10% or less of halohydrocarbons by volume has been effectively purified in accordance with the present invention.

Referring to the figure, liquid propylene oxide containing halohydrocarbon impurities at its boiling point (35° C.) under atmospheric pressure is fed through line 2 to the base of an extractive distillation column. Water, at ambient temperature is fed through line 3 to the top of the extractive distillation column. Heat is applied to a reboiler 4 (temperature 40–50° C.) to drive the light halohydrocarbon impurities up the extractive distillation column. The overheads from the extractive distillation column are taken off via line 5 and condensed by means of a water cooled condenser 6 and refrigerated condenser 7 maintained at −20° C. Part of the condensed overheads, which consist of propylene oxide and light halohydrocarbon impurities, are returned to the column as reflux via line 8 and the remainder run off through line 9. The mixture of water, propylene oxide and heavy halohydrocarbon impurities emerging from the base of the extractive distillation column is fed through line 10 to the distillation column which is maintained with a reboiler 11 temperature of 70–90° C. The overheads from this distillation column are taken off through line 12, and are condensed by means of a water cooled condenser 13 and refrigerated condenser 14. Part of the propylene oxide is returned as reflux through line 15, the remainder being run to storage through line 16. The bottoms from the distillation column consisting of water and heavy halohydrocarbon impurities is run to drain through line 17.

Example

In each of a series of runs, a liquid feed consisting of crude propylene oxide, containing 0.21% by weight of chlorine, and water and, in some runs propylene dichloride, was fed continuously to an Oldershaw 25-plate column connected to a reboiler which was fitted with an electric mantle and a reflux head. A detailed description of the Oldershaw type of distillation column is given in "Technique of Organic Chemistry" vol. IV, "Distillation" published by Interscience Publishers Inc., New York, at pages 222–226. The chlorine impurity consisted mainly of isopropylchloride and vinylidene chloride (80%), 2 chloropropene (5%) and lesser amounts of propylene dichloride and n-propyl chloride. The heavy ends from the first step were continuously discharged from the reboiler to a second similarly equipped 25-plate Oldershaw distillation column in which the second step of the process was effected. Both distillations were carried out in all the runs at substantially atmospheric pressure, the pressure drops across the columns being approximately 25 mm. Hg.

In the first 8 runs the propylene oxide component of the feed to the first (No. 1) column was obtained by previous distillation of the product from dehydrochlorination of propylene chlorhydrin with aqueous caustic soda. In runs 1 and 2 the chlorine content of this feed was doubled by the addition of suitable chlorine compounds.

In runs 9 to 13 the feed to No. 1 column was as supplied from saponification of propylene chlorhydrin without previous distillation the cooled material forming top and bottom layers.

In runs 8, 11, 12 and 13 nitrogen at 77.5, 13, 6.5 and 3.5 litres per hour respectively was passed through No. 1 column, no heat was supplied to the reboiler thereof, and methanol at −15° to −20° C. instead of water was supplied to the reflux condenser system thereof.

The feed to No. 1 column was distributed as follows: In Runs 1 to 8 the entire feed was admitted either at plate 1 e.g. the top plate (runs 3, 4, 5 and 7) or at plate 21 (runs 1, 2, 6 and 8). An additional water supply was admitted at plate 1 in runs 1 and 2 (40 mls. per hour) and run 8 (100 mls. per hour).

In runs 9 to 13 the water component of the feed was admitted at plate 1 and the remainder of the feed at plate 21.

Details are given of the runs in the accompanying table, in which the feed, overhead and bottoms liquid rates are given in mls. per hour, and the propylene oxide and glycol content of the aqueous layer from the bottoms of No. 2 column is given in grams per 100 mls.

TABLE

| Run | No. 1 Column | | | | | | | No. 2 Column | | | | | | | | |
|---|---|---|---|---|---|---|---|---|---|---|---|---|---|---|---|---|
| | Feed | | | Overhead | | Boiler | | Overhead | | | | Bottoms | | | | |
| | $H_2O$ | PO | PC | °C. | R/X | Mls. | °C. | Cl | R/X | °C. | Mls. | °C. | PC Mls. | Aqueous | | PG |
| | | | | | | | | | | | | | | Mls. | PO | |
| 1 | 470 | 196 | 19 | 34.6 | 23 | 10.5 | | | 2.7 | 34.3 | 140 | 71–78 | 10 | 570 | 0.31 | 6.69 |
| 2 | 410 | 205 | 20 | 34.6 | 18 | 10 | | 4.0 | 3 | 34.5 | 135 | 63–73 | 2.5 | 518 | 0.64 | 5.5 |
| 3 | 514 | 206 | 20 | 35.4 | 10 | 15 | | 1.7 | 1.3 | 34.4 | 160 | 79–83 | 30 | 570 | 0.23 | 5.5 |
| 4 | 518 | 207 | 21 | 35.4 | 10 | 11 | | 1.8 | 1.5 | 34.4 | 150 | 80–87 | 30 | 520 | 0.5 | 9.3 |
| 5 | 440 | 191 | 19 | 35.8 | 15 | 10 | | 2.5 | 2.5 | 34.0 | 148 | 74–96 | 17 | 483 | 0.7 | 8.0 |
| 6 | 470 | 196 | 19 | 34.3 | 27 | 10 | | | 1.8 | 34.4 | 140 | 76–82 | 13 | 497 | Nil | 4.8 |
| 7 | 440 | 200 | 20 | 35.3 | 31 | 12 | | | 3.4 | 34.5 | 140 | 69–76 | 12.5 | 448 | 0.3 | 6.5 |
| 8 | 410 | 205 | 20 | 19.0 | 20 | 9 | 19 | 1.5 | 3.2 | 34.7 | 147 | 79–81 | 510 | | Nil | 1.3 |
| 9 | 40 | [1]300 | [2]335 | 34.7 | 9.3 | 27 | 43.5 | 0.41 | 1.2 | 34.5 | 320 | 65–82 | 48 | 292 | 0.3 | 7.2 |
| 10 | 40 | 300 | 300 | 34.7 | | 24 | 43.0 | 0.34 | 1.0 | 34.6 | 303 | 67–79 | 46 | 267 | 0.62 | 7.34 |
| 11 | 43 | 280 | 283 | 19 | 0.8 | 17 | 19 | | 0.8 | 34.0 | 275 | 70–78 | 30 | 306 | 0.7 | 6.0 |
| 12 | 41 | 300 | 300 | 19 | Nil | 16 | 19 | 2.2 | 1.3 | 34.0 | 285 | 72–78 | 42 | 333 | 1.7 | 3.73 |
| 13 | 41 | 290 | 300 | 19 | Nil | 4.2 | 19 | 3.7 | 1.2 | 34.0 | 290 | 70–77 | 40 | 285 | 1.7 | 4.45 |

[1] Top.
[2] Bottom.
PO = Propylene Oxide.
PC = Propylene Dichloride.
PG = Propylene Glycol.
R/X = Reflux Ratio.

The propylene oxide recovery in runs 5–12, based on mls. of propylene oxide recovered per 100 mls. of propylene oxide fed, was in each case at least 70% with the exception of run 6 where it was 66% and the chlorine content of this product was less than 0.1% by weight.

We claim:

1. A process for the purification of propylene oxide from mixture thereof with a light halohydrocarbon impurity obtained in the preparation of the propylene oxide by dehydrohalogenation of propylene chlorohydrin, which comprises subjecting said mixture to a first distillation step in which the impure propylene oxide is distilled by an extractive distillation in a column into which water as an extractant is admitted at an upper feed point, and the impure mixture is admitted at a lower feed point, removing an aqueous solution substantially free from the light halohydrocarbon impurity as a bottom product, distilling the bottom product in a second distillation column and removing the propylene oxide substantially water free as the top product.

2. A process according to claim 1 in which the first step is carried out with reflux in a column to aid the separation of the halohydrocarbon into the vapour phase.

3. A process according to claim 1 in which the first step is carried out in a stream of inert gas.

4. A process according to claim 1 in which the liquid phase from the first step is fed continuously to a distillation unit in the second step.

5. A process for extracting propylene oxide from a mixture thereof with a light and a heavy halohydrocarbon according to claim 1 in which the light halohydrocarbon is separated in the vapour phase in the first step and the heavy halohydrocarbon is separated as a distillation residue in the second step.

6. A process for the purification of propylene oxide from mixture thereof with at most about 10% of a light halohydrocarbon impurity obtained in the preparation of the propylene oxide by dehydrohalogenation of propylene chlorohydrin, which comprises subjecting said mixture to a first distillation step in which the impure propylene oxide is distilled by an extractive distillation in a column into which at least the same liquid volume of water as the mixture is admitted as an extractant at an upper feed point, and the impure mixture is admitted at a lower feed point, removing an aqueous solution substantially free from the light halohydrocarbon impurity as a bottom product, distilling the bottom product in a second distillation column and removing the propylene oxide substantially water free as a top product.

References Cited by the Examiner

UNITED STATES PATENTS

| 1,446,872 | 2/1923 | Brooks | 260—348.6 |
| 2,198,651 | 4/1940 | Bludworth | 203—96 X |
| 2,589,212 | 3/1952 | Agapetus | 203—71 X |
| 2,615,901 | 10/1952 | McClellan | 203—81 X |
| 2,622,060 | 12/1952 | Robeson | 203—83 X |
| 2,663,679 | 12/1953 | Drout | 203—85 X |

FOREIGN PATENTS

| 564,646 | 10/1944 | Great Britain. |
| 772,145 | 4/1957 | Great Britain. |

NORMAN YUDKOFF, *Primary Examiner.*

J. B. DONIHEE, *Assistant Examiner.*